(No Model.) 2 Sheets—Sheet 1.
J. H. MITCHELL.
CAKE AND CONFECTIONERY MACHINE.
No. 257,043. Patented Apr. 25, 1882.
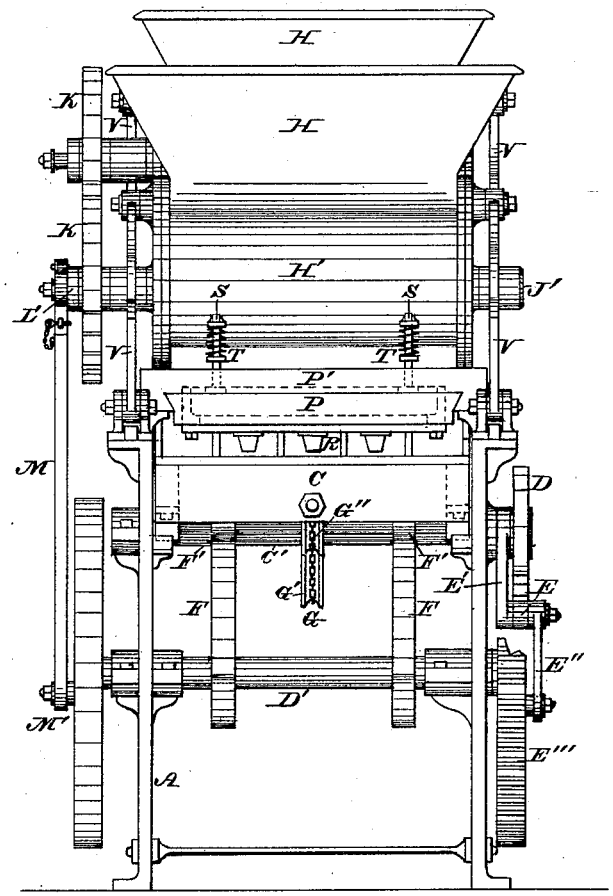
WITNESSES:
L. Douville
W. F. Kircher
INVENTOR:
J. Henry Mitchell,
BY John A. Wiedersheim
ATTORNEY.

(No Model.) 2 Sheets—Sheet 2.
J. H. MITCHELL.
CAKE AND CONFECTIONERY MACHINE.
No. 257,043. Patented Apr. 25, 1882.
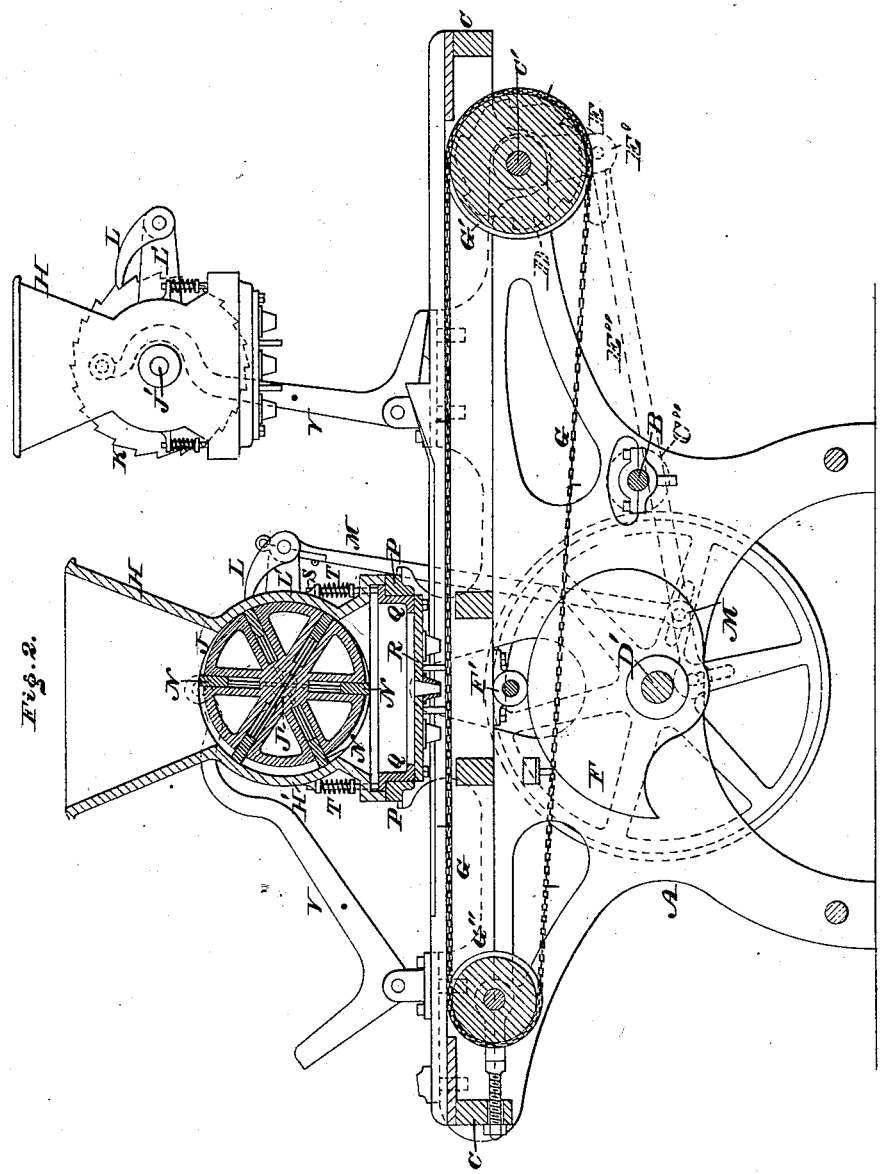
WITNESSES:
INVENTOR:

UNITED STATES PATENT OFFICE.

J. HENRY MITCHELL, OF PHILADELPHIA, PENNSYLVANIA.

CAKE AND CONFECTIONERY MACHINE.

SPECIFICATION forming part of Letters Patent No. 257,043, dated April 25, 1882.

Application filed September 2, 1881. (No model.) Patented in England July 14, 1881.

*To all whom it may concern:*

Be it known that I, J. HENRY MITCHELL, a citizen of the United States, residing at Philadelphia, in the county of Philadelphia and State of Pennsylvania, have invented a new and useful Improvement in Cake and Confectionery Machines, which improvement is full set forth in the following specification and accompanying drawings, in which—

Figure 1 is an end view of the machine embodying my invention. Fig. 2 is a transverse vertical section thereof.

Similar letters of reference indicate corresponding parts in the several figures.

My invention relates to cake and confectionery machines; and it consists, first, of a casing provided with a hopper at top and an opening at the bottom, in combination with an interior cylinder or roller eccentrically mounted, wings which work in and out of said roller, a nozzle-plate, a vertically-movable table, and mechanism for operating said roller and table; second, of the combination, with a hopper or upper chamber for containing dough, dough-feeding mechanism, and a secondary or press chamber provided with nozzles and having a vertically-movable bottom, of a rising and falling table, whereby the rising table operates the nozzle-chamber and dough will be forced out through the nozzles upon the table; third, of the combination, with a hopper or upper chamber for containing dough, dough-feeding mechanism, and a secondary or press chamber provided with nozzles and having a vertically-movable bottom, of a rising and falling table, a nozzle-plate which receives dough from above, a yoke, frame, and springs, all operating substantially as described, whereby the rising of said table and nozzle-plate will force the dough through the nozzles and upon the table, substantially as hereinafter set forth.

Referring to the drawings, A represents the frame of the machine, and B the driving-shaft suitably mounted thereon.

C represents a swinging table, which is mounted at one end on a shaft, C', which, having its bearings on the frame A, carries a ratchet, D, (shown in dotted lines,) with which engages a pawl, E, hung on an arm, E', which latter is loosely fitted to the shaft C' and receives motion by means of a connecting-rod, E'', which is attached to the crank-pin of a gear-wheel, E''', which is mounted on the frame A and meshes with another gear-wheel, C'', keyed or otherwise secured to the shaft B, to which power is imparted in any suitable manner.

To the shaft D' of the wheel E''' are secured cams F, and to the table C are journaled rollers F', the cams being adapted to bear against the rollers and by rotation to elevate the table at intervals.

G represents an endless chain or pan-conveyer passed around pulleys G' G'' at opposite ends of the table, and provided with studs or pins which engage with the pan, the pulleys G' being on the shaft C'.

The features thus far described are in general similar to those shown in applications for Letters Patent previously filed by me.

H represents the hopper and feed-chamber, which is supported on the frame A above the table C, the portion H' being somewhat cylindrical, forming a chamber for the feed-cylinder J, whose shaft or bearing J' is mounted eccentric on the walls of said portion, so that the cylinder is fitted eccentric within the chamber H'.

On the shaft J' is secured a ratchet, K, with which engages a pawl, L, hung on an arm, L', which latter is loosely mounted on the shaft J', and has connected to it a rod, M, which is operated by means of a crank, M', on the shaft D', said crank being slotted for purposes of adjusting the stroke of the rod M and throw of the pawl L. The cylinder J is grooved radially, and in the same are fitted wings N, which are connected in pairs, so that the width of a pair is greater than the diameter of the cylinder, whereby when the cylinder rotates within the chamber H', as it is in contact with one part of said chamber, the wings at one end are guided by the ends of the chamber H' and are forced into the cylinder, and those of the other end are forced out of the cylinder when the former wing reaches the contiguous part of the chamber H'.

The press-chamber below the chamber J is formed of three parts, consisting of the yoke P, the frame Q, and nozzle-plate R. The yoke P depends from and is dovetailed to a rim, P', at the bottom of the chamber H', and the frame Q is fitted to the yoke so as to have a rising-and-falling motion thereon, and has connected to it or bearing against it bolts S, which are passed through said rim P' and encircled by springs T, which bear against studs or shoulders on said bolts, so as to depress the frame.

The dough or other material is placed in the hopper H and the cylinder or roller J rotated by hand, so that the material is forced into the press-chamber through the space between the cylinder and the wall of the chamber H' by the wings which project from the cylinder, said space being in the present case on the left-hand side of the chamber, as in Fig. 1. When the material appears in the nozzles the machine is started by applying power to the shaft B. The cams F elevate the table C, the rod M operates the ratchet K, and consequently the feed-cylinder, and the ratchet D moves the pan feed or conveyer. As the cam F lifts the table C it comes in contact with the studs or stops of the nozzle-plate R, causing the frame Q to rise, the tension of the springs T being overcome. This compresses the dough in the chamber H' and causes it to flow out upon the pan below. After the deposit is formed the cam F lowers the table C and the springs T press the frame downwardly, following the descent of the table for a short distance, sufficient to stop the flow of the dough by the release of the pressure. The table continues to lower and the connection of the deposit and nozzles is broken. The pan then travels for another deposit, and the feed of the cylinder or roller J is simultaneously made with said motion of the pan, after which the other operations, stated above, are repeated.

For the purpose of ornamenting cakes, &c., I employ a secondary hopper and feed-chamber provided with the feed-cylinder and the press-chamber. The hopper is pivoted to arms V, which are pivoted to the frame A, and the connection between the arm M and pawl-carrying arm L' is separable. This feature, however, may be made the subject-matter of another application for Letters Patent.

Instead of the table A being separated from the hopper, the latter may be separated from the former, as in my previous applications for Letters Patent.

Having thus described my invention, what I claim as new, and desire to secure by Letters Patent, is—

1. In a cake or confectionery machine, a casing provided with a hopper at top and an opening at the bottom, in combination with an interior cylinder or roller eccentrically mounted, wings which work in and out of said roller, a nozzle-plate, a vertically-movable table, and mechanism for operating said roller and table, substantially as set forth.

2. In a cake and confectionery machine, the combination, with a hopper or upper chamber for containing dough, dough-feeding mechanism, and a secondary or press chamber provided with nozzles, and having a vertically-movable bottom, of a rising and falling table, whereby the rising table operates the nozzle-chamber and dough will be forced out through the nozzles upon the table, substantially as specified.

3. In a cake and confectionery machine, the combination, with a hopper or upper chamber for containing dough, dough-feeding mechanism, and a secondary or press chamber provided with nozzles, and having a vertically-movable bottom, of a rising and falling table, a nozzle-plate which receives dough from above, a yoke, frame, and springs, all operating substantially as described, whereby the rising of said table and nozzle-plate will force the dough through the nozzles and upon the table, substantially as set forth.

J. HENRY MITCHELL.

Witnesses:
JOHN A. WIEDERSHEIM,
GEORGE L. PLITT.